US009362982B2

(12) United States Patent
Rao et al.

(10) Patent No.: US 9,362,982 B2
(45) Date of Patent: Jun. 7, 2016

(54) METHOD AND APPARATUS FOR PERFORMING MULTI-SYMBOL RATE VECTORING

(71) Applicant: IKANOS COMMUNICATIONS, INC., Fremont, CA (US)

(72) Inventors: Murli Mohan Rao, Fremont, CA (US); Julien Daniel Pons, Metuchen, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/642,029

(22) Filed: Mar. 9, 2015

(65) Prior Publication Data

US 2015/0256221 A1    Sep. 10, 2015

Related U.S. Application Data

(60) Provisional application No. 61/949,447, filed on Mar. 7, 2014.

(51) Int. Cl.
| | |
|---|---|
| *H04B 3/32* | (2006.01) |
| *H04L 12/911* | (2013.01) |
| *H04L 12/927* | (2013.01) |
| *H04M 11/06* | (2006.01) |
| *H04B 1/38* | (2015.01) |

(52) U.S. Cl.
CPC .. *H04B 3/32* (2013.01); *H04B 1/38* (2013.01); *H04L 47/70* (2013.01); *H04L 47/805* (2013.01); *H04M 11/062* (2013.01); *H04M 11/066* (2013.01)

(58) Field of Classification Search
CPC ............... H04B 1/38; H04B 1/3827; H04B 1/3877;H04B 1/40; H04B 3/00; H04B 3/20; H04B 3/23; H04B 3/32; H04B 3/50; H04L 47/70; H04L 47/805; H04M 11/066; H04M 11/062
USPC .......... 375/219, 220, 222, 259, 260; 370/278, 370/280–282, 286, 295, 296; 379/406.05, 379/406.06, 399.01, 399.02, 417; 455/73, 455/88
See application file for complete search history.

(56) References Cited

U.S. PATENT DOCUMENTS

| | | | | |
|---|---|---|---|---|
| 8,982,934 | B2* | 3/2015 | Gupta | H04L 27/30 375/222 |
| 2004/0146072 | A1* | 7/2004 | Farmwald | H04L 12/2856 370/537 |
| 2010/0046593 | A1* | 2/2010 | Schenk | H04B 3/487 375/222 |
| 2010/0177838 | A1* | 7/2010 | Schenk | H04B 3/32 375/285 |

(Continued)

FOREIGN PATENT DOCUMENTS

WO    WO2012-113743 A1    8/2012

OTHER PUBLICATIONS

International Search Report and Written Opinion issued Jun. 10, 2015 for PCT/US2015/019480.

*Primary Examiner* — Young T Tse
(74) *Attorney, Agent, or Firm* — Holland & Hart LLP (57) ABSTRACT

The present invention is directed to methods and apparatuses for performing concurrent vectoring of systems having communications performed at different symbol rates. In embodiments, where a common binder includes different sub-groups of lines having corresponding different symbol rates, the invention includes methods and apparatuses for managing and concurrently vectoring all the lines of the different sub-groups.

18 Claims, 5 Drawing Sheets

(56) References Cited

U.S. PATENT DOCUMENTS

| | | | |
|---|---|---|---|
| 2011/0007788 A1* | 1/2011 | Cendrillon | H04B 3/32 375/222 |
| 2011/0058468 A1 | 3/2011 | Singh et al. | |
| 2011/0080938 A1 | 4/2011 | Fisher et al. | |
| 2011/0142111 A1 | 6/2011 | Sands et al. | |
| 2012/0327986 A1* | 12/2012 | Schenk | H04B 3/32 375/222 |
| 2013/0294597 A1 | 11/2013 | Shi et al. | |
| 2014/0105314 A1* | 4/2014 | Liu | H04B 3/32 375/257 |
| 2014/0328442 A1* | 11/2014 | Liu | H04L 7/0079 375/359 |
| 2015/0381309 A1* | 12/2015 | Goodson | H04L 1/0002 379/93.08 |

* cited by examiner

METHOD AND APPARATUS FOR PERFORMING MULTI-SYMBOL RATE VECTORING

CROSS-REFERENCE TO RELATED APPLICATIONS

This application claims the benefit under 35 USC 119(e) of prior U.S. Provisional Patent Application No. 61/949,447, filed Mar. 7, 2014, the disclosure of which is hereby incorporated by reference in its entirety.

FIELD OF THE INVENTION

The present invention relates generally to xDSL systems, and more particularly to methods and apparatuses for performing concurrent vectoring of systems having communications performed at different symbol rates.

BACKGROUND OF THE INVENTION

In xDSL (VDSL, VDSL2, G.Fast, etc.) systems, vectoring is an effective way to perform crosstalk cancellation (e.g. FEXT cancellation), thereby improving performance. For example, in a central office (CO) DSLAM, a vectoring system can effectively cancel FEXT between all lines in a vectoring group (e.g. all lines in a common binder). A problem exists when a binder includes lines coupled to CPE modems that do not all support the same symbol rates, for example some CPE modems that support VDSL2 with approximately a 4 KHz symbol rate, and other CPE modems that support G.Fast with approximately a 48 KHz symbol rate. In such situations, the vectoring group can either contain only the lines coupled to VDSL2 modems, or only the lines coupled to G.Fast modems. In other words, it is currently not possible to vector (i.e. perform crosstalk cancellation for) all the lines simultaneously.

SUMMARY OF THE INVENTION

The present invention is directed to methods and apparatuses for performing concurrent vectoring of systems having communications performed at different symbol rates. In embodiments, where a common binder includes different sub-groups of lines having corresponding different symbol rates, the invention includes methods and apparatuses for managing and concurrently vectoring all the lines of the different sub-groups.

In accordance with these and other aspects, a method according to embodiments of the invention includes concurrently performing vectoring with a plurality of xDSL modems, wherein certain of the xDSL modems use a first symbol rate, and certain other of the xDSL modems use a second symbol rate, wherein the second symbol rate is slower than the first symbol rate.

In further accordance with these and other aspects, an apparatus according to embodiments of the invention includes a plurality of xDSL modems, wherein certain of the xDSL modems use a first symbol rate, and certain other of the xDSL modems use a second symbol rate, wherein the second symbol rate is slower than the first symbol rate, and a vector control entity that concurrently performs vectoring with both the certain of the xDSL modems using the first symbol rate, and the certain other of the xDSL modems using the second symbol rate.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
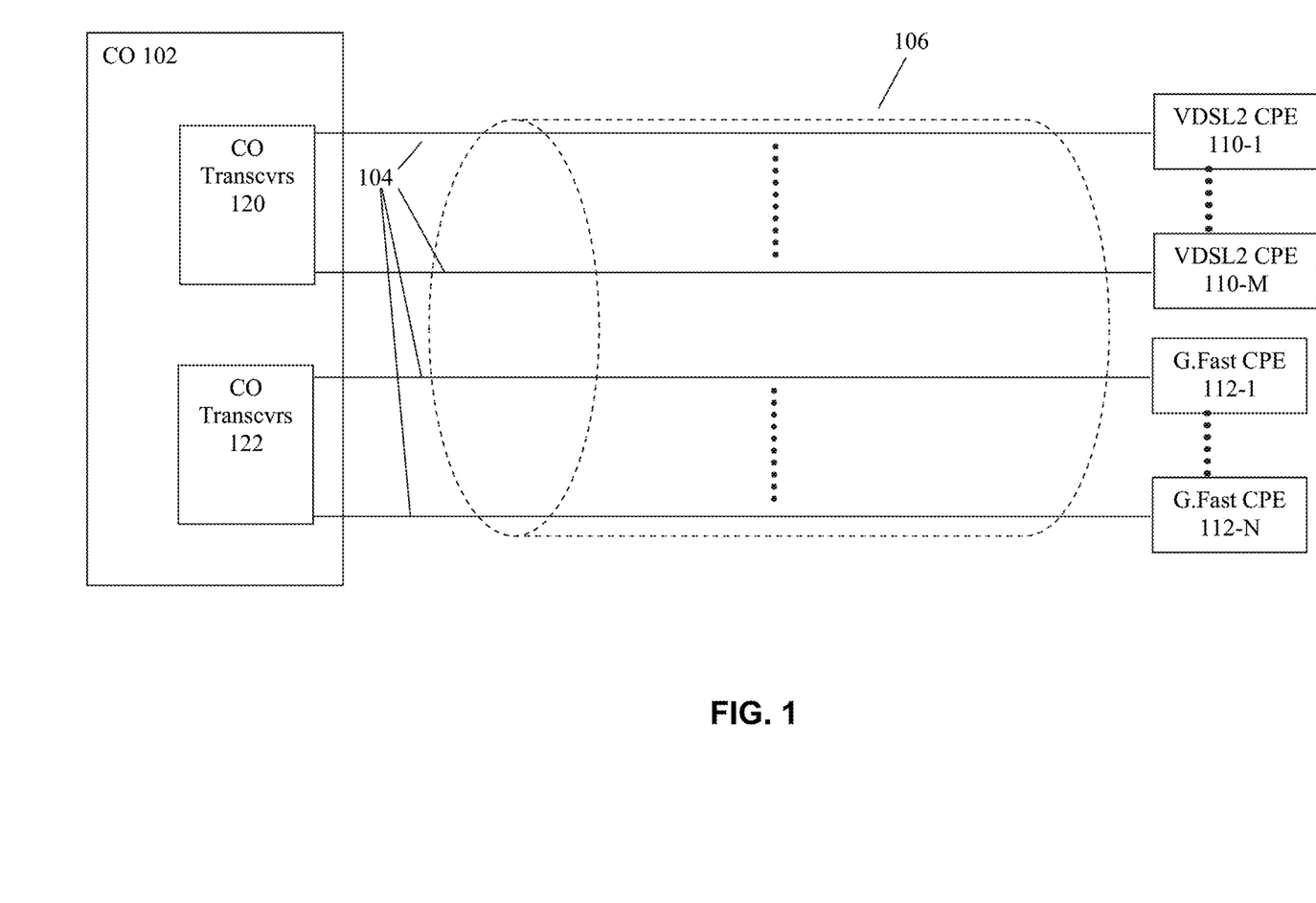
FIG. 1 is a block diagram illustrating an example system for concurrent vectoring of lines coupled to modems operating at different symbol rates according to embodiments of the invention.

As set forth above, embodiments of the invention allow for concurrent FEXT cancellation to be performed across lines coupled to xDSL modems that support vectoring but operating at different symbol rates. FIG. 1 is a block diagram illustrating an example system for performing such concurrent FEXT cancellation according to embodiments of the invention.

As shown, bundle 106 includes wire pairs 104, certain of which wire pairs 104 are coupled between M CPE transceivers 110 that operate with low symbol rates such as 4 kHz (e.g. VDSL2 compatible modems) and corresponding CO transceivers 120, while other pairs 104 are coupled between N CPE transceivers 112 that operate at higher symbol rates such as 48 kHz (e.g. G.Fast compatible modems) and corresponding CO transceivers 122. Given that portions of the wire pairs 104 to these different types of CPE modems 110, 112 can exist in the same bundle 106, crosstalk (e.g. FEXT) between the lines having the same type of CPE modems exists, which leads to a reduction in performance.

Vectoring technologies can improve performance due to FEXT between lines coupled to modems that support such technologies. For example, conventional vectoring systems can allow for FEXT cancellation between lines 104 coupled to the M modems 110 and for FEXT cancellation between lines 104 coupled to the N modems 112. However, in cases such as that shown in FIG. 1, where lines 104 are in the same bundle 106 and/or where CO modems 120 and 122 are incorporated together in the same hardware having the same vector processing, the CO 102 must choose only one set of lines on which to perform vectoring (i.e. either the lines 104 coupled to the M modems 110 or the lines 104 coupled to the N modems 112). In other words, in cases such as that shown in FIG. 1, conventional vectoring technologies and systems cannot allow for FEXT cancellation to be simultaneously performed on lines 104 coupled to both types of CPE modems 110 and 112, even though such CPE modems support vectoring.

According to one aspect, embodiments of the invention allow for simultaneous FEXT cancellation between the lines 104 associated with the two different symbol-rate modems 110, 112 by creating two different vector-groups, one vector-group for performing FEXT cancellation on lines 104 coupled to modems 110, and one vector-group for performing FEXT cancellation on lines 104 coupled to modems 112.

It should be noted that the symbol rates used by the modems 110, 112 of the different vector-groups do not need to be integer multiples.

Figure 2:
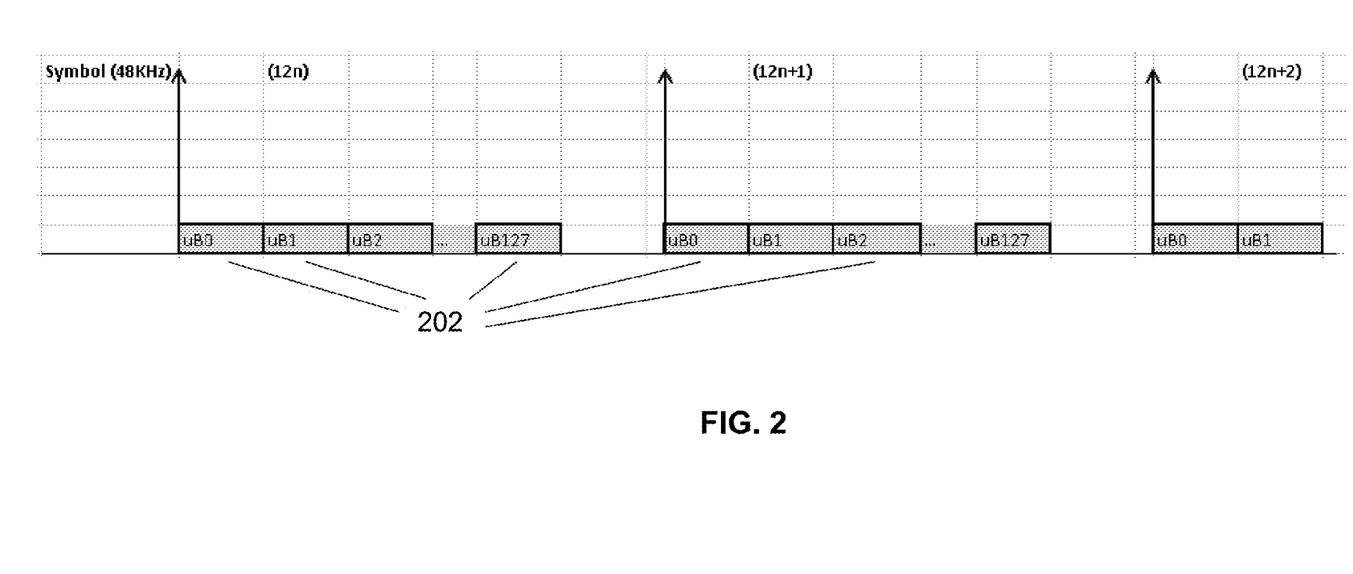
FIG. 2 is a diagram illustrating vectoring for a system including lines with only G.Fast modems.

To illustrate aspects of the invention, FIG. 2 shows an example of how vectoring is performed among lines coupled to G.Fast modems operating at a symbol rate of approximately 48 kHz. According to certain aspects, in embodiments of the invention, communication of tone-data in the system (e.g. from/to a vector control entity) during each symbol period is separated into uBands according to the amount of data associated with total numbers of tones and lines in the system. Accordingly, as shown in this example, each G.Fast symbol (i.e. $12n$, $12n+1$, etc.) includes 2048 tones that are split into 128 microbands (i.e. uBands) 202, with each uBand including 16 tones. Therefore, in order to perform vectoring on all G.Fast lines, FEXT cancellation data (e.g. 8×8 FEXT cancellation matrix data for an 8-port vector-group) must be generated at each G.Fast symbol period (i.e. $12n$, $12n+1$, etc.) for all 2048 tones and all lines in the vector-group, and communicated to each of the G.Fast modems in the vector-group in batches associated with each of the uBands.

Figure 3:
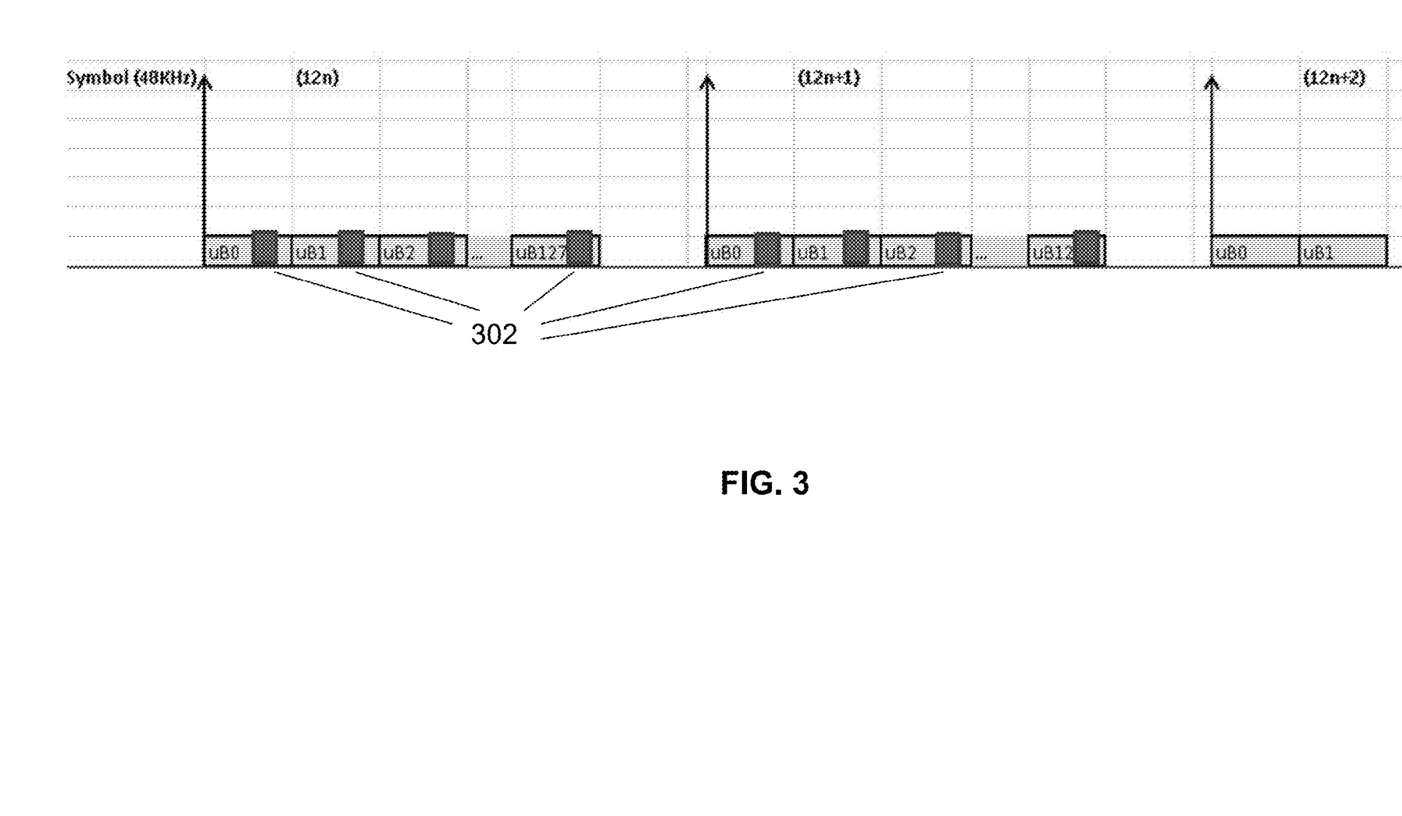
FIG. 3 is a diagram illustrating vectoring for a system including sub-groups of lines with G.Fast and VDSL2 modems according to embodiments of the invention.

FIG. 3 provides an illustration of how embodiments of the invention perform concurrent vectoring of a system having lines coupled to both VDSL2 modems 110 operating at 4 kHz symbol rates and G.Fast modems 112 operating at 48 kHz symbol rates such as that shown in FIG. 1.

In this example, as in the previous example, each G.Fast symbol with 2048 tones is split into 128 uBands, with 16 tones in each uBand. Meanwhile, each VDSL2 symbol with 4096 tones at 4 KHz is split into 256 uBands, with 16 tones in each uBand to match the uBands of the G.Fast vectoring scheme.

As mentioned above, in this example, the vectoring system in embodiments of the invention creates two different vector-groups, one vector-group for performing FEXT cancellation on lines 104 coupled to VDSL2 modems 110, and one vector-group for performing FEXT cancellation on lines 104 coupled to G.Fast modems 112. However, the vectoring system needs to operate at the higher symbol rate (i.e. 48 kHz) to accommodate the rate at which vector cancellation data needs to be generated for the G.Fast modems 122. Accordingly, in this example, tone-data 302 for the VDSL2 modems is generated and split across two G.Fast symbol periods, $12n$ and $12n+1$, and spliced into the 128 G.Fast uBands as shown in FIG. 3, thereby concurrently performing vectoring for both vector-groups. In symbol periods $12n+2$ to $12n+11$, vectoring is performed only for the G.Fast vector-group. In an example where the total number of lines is 8, and where there are three VDSL2 lines and five G.Fast lines, this means that both 5×5 vectoring for the G.Fast group and 3×3 vectoring for the VDSL2 group is performed in G.Fast symbol periods $12n$ and $12n+1$, while only 5×5 vectoring is performed for the G.Fast vector group in symbol periods $12n+2$ to $12n+11$.

It should be noted that G.Fast uses time division duplexing (TDD), while most other xDSL systems such as VDSL2 use frequency division duplexing (FDD). However, this is not an issue according to embodiments of the invention, where the frequencies used in the different systems are non-overlapping.

Figure 4:
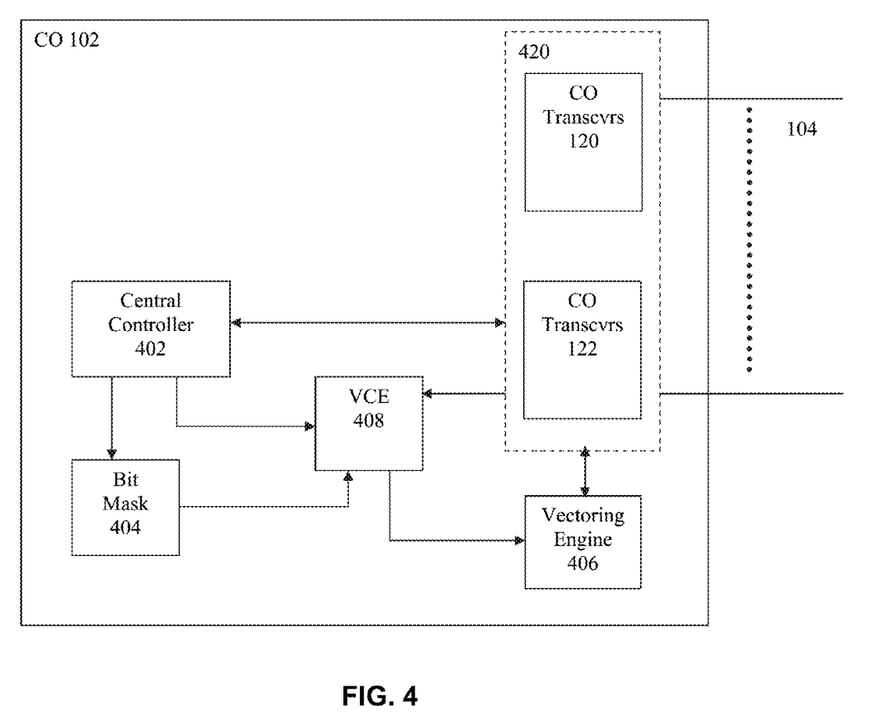
FIG. 4 is a block diagram illustrating an example implementation of a CO side apparatus for performing concurrent vectoring of lines coupled to modems operating at different symbol rates according to embodiments of the invention.

A block diagram illustrating an example CO 102 for implementing aspects of the present invention is shown in FIG. 4. As shown, in addition to components illustrated in FIG. 1, CO 102 includes central controller 402, bit mask 404, vectoring engine 406 and vector control entity (VCE) 408.

Central controller 302, vectoring engine 306 and VCE 308 can be implemented by processors, chipsets, firmware, software, etc. such as NodeScale Vectoring products provided by Ikanos Communications, Inc. Those skilled in the art will be able to understand how to adapt these and other similar commercially available products after being taught by the present examples.

Meanwhile, CO transceivers 120 and 122 include conventional processors, chipsets, firmware, software, etc. that implement communication services such as those defined by VDSL2 and G.Fast, respectively. Further details thereof will be omitted for sake of clarity of the invention. It should be noted that CO transceivers 120 and CO transceivers 122 are shown separately for ease of illustration; however, it is possible that the same CO transceivers can include functionality for communicating both with VDSL2 CPE transceivers 110 and G.Fast CPE transceivers 112, depending on the capabilities of the CPE modem connected at the downstream end, as learned in an initialization stage for example. It should be further noted that CO transceivers 120, 122 can include functionality for communicating with CPE transceivers that only support non-vectoring protocols such as ADSL2. Still further, although shown separately for ease of illustration, some or all of components 402, 404, 406, 408, 420 and 422 may be incorporated into the same chip or chipsets.

According to aspects of the invention illustrated in FIG. 4, CO transceivers 120 and CO transceivers 122 are incorporated into the same device 420, for example an 8-port transceiver chip which communicates with vectoring engine 406 to perform vectoring (i.e. FEXT cancellation). For example, as is known in the art, this includes performing vector decoding of downstream symbols in the frequency domain before they are converted to time domain signals transmitted on lines 404.

In operation, when a CPE modem 110, 112 first connects to one of lines 104, controller 402 and the corresponding CO transceiver 120, 122 communicate the type of modem attached (i.e. VDSL2 or G.Fast), and controller 402 causes VCE 408 to update the vector-group associated with that type of modem to indicate the port of device 420 to which that modem 110, 112 is connected. As in the conventional manner, controller 402 then causes the VCE 408 to start learning down-stream coefficients for FEXT coupling other of lines 104 coupled to the same type of modem (i.e. VDSL2 or G.Fast) and update the associated channel matrix used by vectoring engine 406. It should be noted that, although not shown in FIG. 4, VCE 408 can maintain two separate channel matrices for the two vector-groups.

When FEXT coefficients have been learned, they are programmed into the precoder used by vectoring engine 406 by VCE 408. During Showtime, for example as described above in connection with FIG. 3, G.Fast and VDSL2 communications by transceivers 120, 122 can then proceed with concurrent vectoring by VCE 408 and vectoring engine 406 of both G.Fast and VDSL2 communications according to the invention.

FIG. 4 further illustrates an example embodiment where a bit mask approach is used to manage the two vector-groups. For example, assume that of a total of 8 lines coupled to transceiver chip 420, there are five lines 104 coupled to G.Fast modems 112 and three lines 104 coupled to VDSL2 modems 110. Accordingly, controller 402 sets the bit mask 404 for the two vector-groups (where G.Fast is 1 and VDSL2 is 0) to 11110001, where each bit identifies a port corresponding to one line in the 8-port system.

Knowing the bit mask configuration, VCE 408 can thus manage concurrent vectoring of both of the G.Fast and VDSL2 vector groups. In the example shown in FIG. 3, in symbols 12n+2 to 12n+11, vectoring is performed only for the G.Fast vector-group (e.g. 5×5 vectoring in the above bit mask example). In symbols 12n and 12n+1, concurrent vectoring is performed for both the G.Fast vector-group (e.g. 5×5 vectoring in the above bit mask example) and the VDSL2 vector-group (e.g. 3×3 vectoring in the above bit mask example). In embodiments using microbands according to the invention, this includes splicing VDSL2 tone-data communicated with vectoring engine 406 for the VDSL2 lines into the microbands together with G.Fast tone-data for the G.Fast during the first two G.Fast symbols 12n and 12n+1, while only communicating G.Fast tone-data for the ten remaining G.Fast symbols 12n+2 to 12n+11 in each twelve symbol sequence.

It should be noted that the principles of the invention are not limited to two vector-groups and/or two different types of vectoring protocols. For example, if there are modems associated with three different types of communication protocols that support vectoring, then three different vector-groups can be created, and a look-up table used instead of a bit mask.

Figure 5:
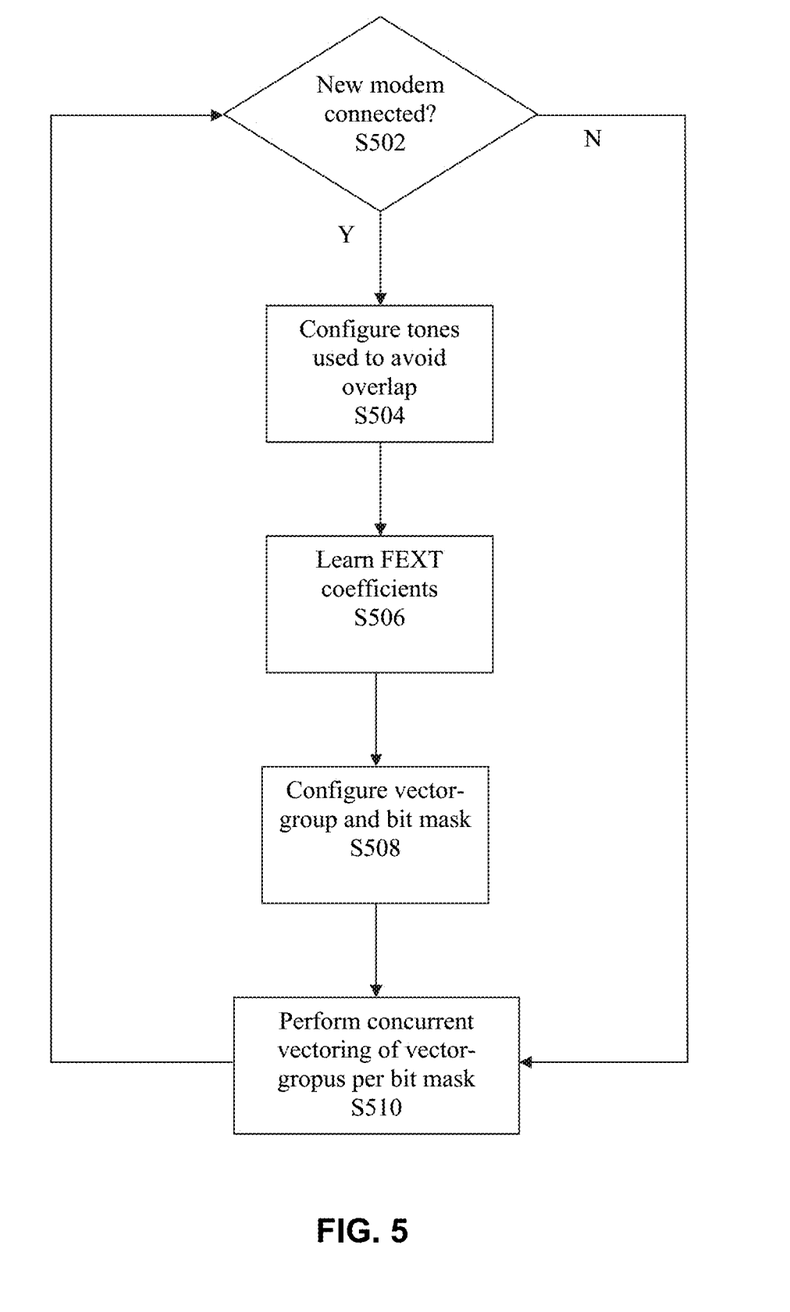
FIG. 5 is a flowchart illustrating an example method for performing concurrent vectoring of lines coupled to modems operating at different symbol rates according to embodiments of the invention.

FIG. 5 is a flowchart illustrating an example methodology for performing concurrent vectoring of lines connected to modems operating at different symbol rates.

As shown, in step S502, controller 402 determines when a new modem 110, 112 is connected to one of lines 104.

When a new modem is detected, in 5504 controller 402 determines the type of modem connected, such as VDSL2 or G.Fast. Controller 402 then causes the associated CO transceiver 120, 122 to initialize the modem, including causing the modem 110, 112 to use tones that do not overlap in frequency with tones used by the other types of modems. For example, where the types of modems can be either VDSL2 or G.Fast, which use 4096 and 2048 tones, respectively, controller 402 prevents overlapping frequencies in the two types of modems by setting the highest tone used by VDSL2 modems 110 to be lower in frequency than the starting tone used by G.Fast modems 112.

Next in S506, FEXT coefficients are learned by VCE 408 in the conventional manner using transceivers 120, 122 and the channel matrix for the associated type of modem (e.g. VDSL2 or G.Fast) is updated.

Further in step S508, controller 402 updates the vector-group associated with the type of modem that has newly connected so VCE 408 knows how to control vectoring among lines 104. For example, this can include communicating to VCE 408 the port of chip 420 to which the modem is connected. As shown, step S508 can include setting a bit mask 404 used by VCE 408 to control concurrent vectoring.

In step S510, with the newly updated vectoring parameters, concurrent vectoring of communications with modems connected to lines 104 is performed as described in more detail above, and as configured as described in the preceding steps.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   concurrently performing vectoring with a plurality of xDSL modems, wherein certain of the xDSL modems use a first symbol rate, and certain other of the xDSL modems use a second symbol rate, the second symbol rate being slower than the first symbol rate, and wherein concurrently performing the vectoring includes:
   in a first subset of symbols at the first symbol rate, causing crosstalk cancellation data to be communicated for both the certain xDSL modems and the certain other xDSL modems; and
   in a second subset of symbols at the first symbol rate, causing crosstalk cancellation data to be communicated only for the certain xDSL modems and not for the certain other xDSL modems.

2. The method of claim 1, wherein the first symbol rate is an integer multiple of the second symbol rate of two or more.

3. The method of claim 1, further comprising configuring the certain xDSL modems to use tones that are all higher in frequency than tones used by the certain other xDSL modems.

4. The method of claim 1, wherein the plurality of xDSL modems are all incorporated in the same modem chip.

5. The method of claim 1, further comprising configuring a first vector-group for the certain xDSL modems and a second vector-group for the certain other xDSL modems.

6. The method of claim 5, wherein concurrently performing the vectoring includes managing crosstalk cancellation data communicated during each symbol period at the first symbol rate in accordance with the configured first and second vector-groups.

7. The method of claim 5, further creating a bit mask identifying which of the plurality of xDSL modems belong to the configured first and second vector-groups, and wherein concurrently performing the vectoring includes managing crosstalk cancellation data communicated during each symbol period at the first symbol rate in accordance with the bit mask.

8. The method of claim 1, wherein a time period associated with a total of the first and second subsets of symbols corresponds to the second symbol rate.

9. The method of claim 1, wherein all of the plurality of xDSL modems are coupled to lines in the same binder.

10. An apparatus comprising:
- a plurality of xDSL modems, wherein certain of the xDSL modems use a first symbol rate, and certain other of the xDSL modems use a second symbol rate, wherein the second symbol rate is slower than the first symbol rate; and
- a vector control entity that concurrently performs vectoring with both the certain of the xDSL modems using the first symbol rate, and the certain other of the xDSL modems using the second symbol rate, wherein the vector control entity concurrently performs the vectoring by:
  - in a first subset of symbols at the first symbol rate, causing crosstalk cancellation data to be communicated for both the certain xDSL modems and the certain other xDSL modems; and
  - in a second subset of symbols at the first symbol rate, causing crosstalk cancellation data to be communicated only for the certain xDSL modems and not for the certain other xDSL modems.

11. The apparatus of claim 10, wherein the first symbol rate is an integer multiple of the second symbol rate of two or more.

12. The apparatus of claim 10, further comprising a controller that configures the certain xDSL modems to use tones that are all higher in frequency than tones used by the certain other xDSL modems.

13. The apparatus of claim 10, wherein the plurality of xDSL modems are all incorporated in the same modem chip.

14. The apparatus of claim 10, further comprising a controller that configures a first vector-group for the certain xDSL modems and a second vector-group for the certain other xDSL modems.

15. The apparatus of claim 14, wherein the vector control entity concurrently performs vectoring by managing crosstalk cancellation data communicated during each symbol period at the first symbol rate in accordance with the configured first and second vector-groups.

16. The apparatus of claim 14, wherein the controller further creates a bit mask identifying which of the plurality of xDSL modems belong to the configured first and second vector groups, and wherein the vector control entity concurrently performs vectoring by managing crosstalk cancellation data communicated during each symbol period at the first symbol rate in accordance with the bit mask.

17. The apparatus of claim 10, wherein a time period associated with a total of the first and second subsets of symbols corresponds to the second symbol rate.

18. The apparatus of claim 10, wherein all of the plurality of xDSL modems are coupled to lines in the same binder.

* * * * *